United States Patent
Palmatier et al.

[19]

[11] Patent Number: 5,987,949

[45] Date of Patent: Nov. 23, 1999

[54] PLATE SCANNER—BENDING DEVICE

[75] Inventors: Roland Thomas Palmatier, Durham; Jackson Hacker Jones, Rochester; Robert Richard Murray, Madbury; John Sheridan Richards, Barrington, all of N.H.

[73] Assignees: Heidelburg Harris, Inc., Dover, N.H.; Heidelberger Druckmaschinen AG, Heildelberg, Germany

[21] Appl. No.: 08/820,486

[22] Filed: Mar. 18, 1997

[51] Int. Cl.[6] ................................. B21B 37/00
[52] U.S. Cl. .................. 72/17.3; 72/306; 72/319; 72/37
[58] Field of Search .................. 72/17.3, 18.1, 72/18.2, 18.5, 19.4, 31.1, 31.12, 37, 306, 319, 320, 321, 323, 324, 411, 420, 421, 422; 101/378, 401.1, 415.1, DIG. 36, DIG. 45

[56] References Cited

U.S. PATENT DOCUMENTS

| | | | |
|---|---|---|---|
| 4,594,868 | 6/1986 | Takeuchi et al. | 72/319 |
| 4,598,568 | 7/1986 | Stadler | 72/320 |
| 4,681,455 | 7/1987 | Jeschke et al. | |
| 5,031,440 | 7/1991 | Enami | 72/421 |
| 5,187,958 | 2/1993 | Prunotto et al. | 72/420 |
| 5,193,690 | 3/1993 | Powers et al. | 72/420 |
| 5,257,444 | 11/1993 | Nishiyama | 72/324 |
| 5,454,247 | 10/1995 | Powers et al. | 72/319 |
| 5,502,993 | 4/1996 | Powers et al. | 72/319 |
| 5,542,002 | 7/1996 | Choate et al. | |

FOREIGN PATENT DOCUMENTS

| | | |
|---|---|---|
| 42 28 904 | 3/1994 | Germany. |
| 2 275 655 | 9/1994 | United Kingdom. |

OTHER PUBLICATIONS

Brochure—"Akiyama Register Punch", Akiyama Machinery Trading Corp., Akiyama Printing Mach. Mfg. Corp., Aug. 1988.
Brochure—"Electronic–Hydraulic Bender", pp. 8, 10, 11.

*Primary Examiner*—Joseph J. Hail, III
*Assistant Examiner*—Ed Tolan
*Attorney, Agent, or Firm*—Kenyon & Kenyon

[57] ABSTRACT

A plate scanner-bending device having a plate bed for receiving a printing plate and a plate driver for moving the printing plate along the plate bed is disclosed. At least one scan sensor is located above the plate bed for scanning an image on the printing plate for density, along with at least one register sensor for sensing a register mark on the printing plate. The plate bed has at least one anvil at one end for a bending mechanism for bending the plate.

20 Claims, 6 Drawing Sheets

PLATE SCANNER— BENDING DEVICE

FIELD OF THE INVENTION

The invention relates generally to printing presses, and more particularly to plate benders and scanners for a printing plate in a printing press.

RELATED TECHNOLOGY

An offset printing press typically includes at least one plate cylinder, onto which a printing plate may be fastened. For color printing, an original image is typically separated into images representing four different colors (typically black, magenta, yellow and cyan). Four printing plates corresponding to these colors are placed on plate cylinders in consecutive print units of the printing press. As a sheet or web of paper passes through the consecutive print units, the individual colors are printed, resulting in a reproduction of the original image.

Before placement on the plate cylinder, each printing plate typically is scanned to read the requisite density for ink fountain keys which will ink the various plates during printing. The ink fountain keys are thus preset based on the read density.

In order to properly reproduce the color image, the images on the four printing plates must be aligned on their respective plate cylinder, so that as the sheet or web of paper passes through the consecutive print units, the different color is placed at the proper area. This image alignment is known as register. The printing plate typically has a bend at one end known as the lead edge and a bend at the other end known as the trail edge. To attach the printing plate to the plate cylinder, the lead edge is typically placed in the clamping gap of the plate cylinder. The plate is then wound around the plate cylinder and the trail edge is fit through the clamping gap and attached to the lead spring hook and lock up reel. The plate is then tightened by the lock up reel so as to fix the plate on the plate cylinder.

Register should be proper in both the circumferential and in the sideways or axial direction of the printing plates. As a general rule, the axial movement of the plate can be limited by a register plate stop on the print cylinder: either a pin for the plate to bump up against, or a notch in the plate with a fixed pin in the cylinder for the notch to mate with. The proper alignment of the images on the plates in the axial direction is known as side lay register.

For proper circumferential register, the relative positions of the clamping gaps of the several plate cylinders may be known. The image on the plate, which may include register target marks, is then read, and each plate is bent at the proper place to ensure proper circumferential register. Holes may be punched in the plate by a hole punch before the bending takes place, if the clamping mechanism requires such holes.

The plate bending step typically requires a separate piece of equipment in a press shop. The scanner for producing preset data for ink key settings has also been a separate piece of equipment. These two pieces of equipment often take up a large amount of space in a print shop.

SUMMARY OF THE INVENTION

The present invention provides a plate scanner-bending device comprising a plate bed for receiving a printing plate, a plate driver for moving the printing plate along the plate bed, at least one scan sensor located above the plate bed for scanning an image on the printing plate for density, at least one register sensor for sensing a register mark on the printing plate, the plate bed having at least one anvil at one side; and a bending mechanism located next to the anvil for bending the plate.

The present invention thus provides a compact single unit bender and scanner. Part of the side of the plate bed of the scanner is available for use as the anvil of a bending mechanism.

Moreover, to further reduce the size of the scanner-bending device, the present invention advantageously may use at least two density sensors, so that each scanner can scan part of the plate which is required to be scanned. "Density" may be understood as the "pixel area" or "area to be covered by ink," meaning the area covered by the image within the particular stripe of the plate corresponding to a particular ink fountain key. The density sensor comprises a light source (photon emitter), a light sensor (photon-electron converter) and a calibration system to establish an electron value for 0% to 100% of the image coverage of the particular stripe, which corresponds to the density.

A microprocessor is also provided to determine the proper bend location on the plate.

A register drive mechanism can measure and control the circumferential and axial position of each plate cylinder relative to the other plate cylinders and can feed this information to the microprocessor.

DETAILED DESCRIPTION

Figure 1:
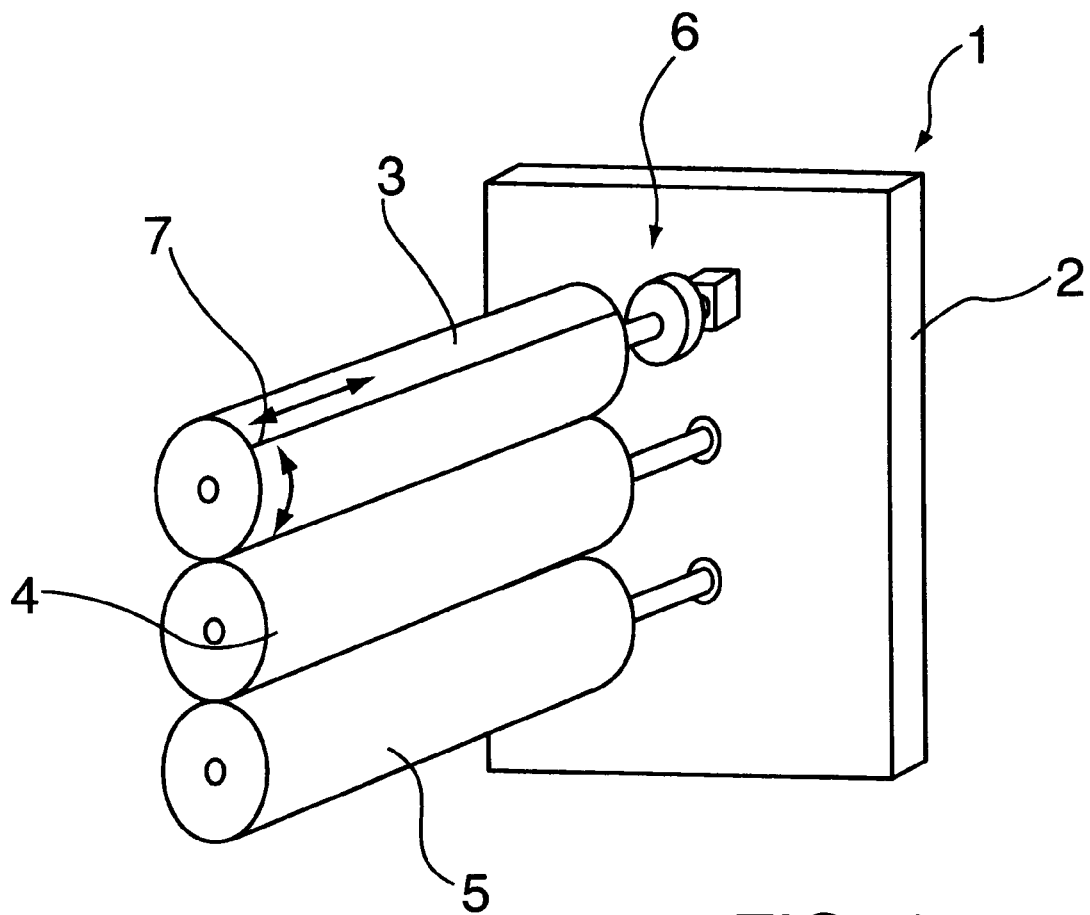
FIG. 1 schematically shows an arrangement of cylinders in a print unit.

FIG. 1 schematically shows a printing press 1 having at least one offset print unit 2. Each print unit 2 comprises a plate cylinder 3, a blanket cylinder 4 and an impression cylinder 5. A register drive mechanism 6 is associated with each plate cylinder 3 and can both read and adjust the circumferential and axial position of the plate cylinder 3 with respect to any other plate cylinders within the printing press 1, as shown by the arrows. The plate cylinder 3 shown has an axially extending gap 7 on the surface of the plate cylinder. Edges of a printing plate may be fit within the gap 7 and be fastened there, for instance by a clamping mechanism. The register drive mechanisms 6 of the print units 2 are connected electronically to a plate scanner-bending device, which is described below.

Figure 2A:
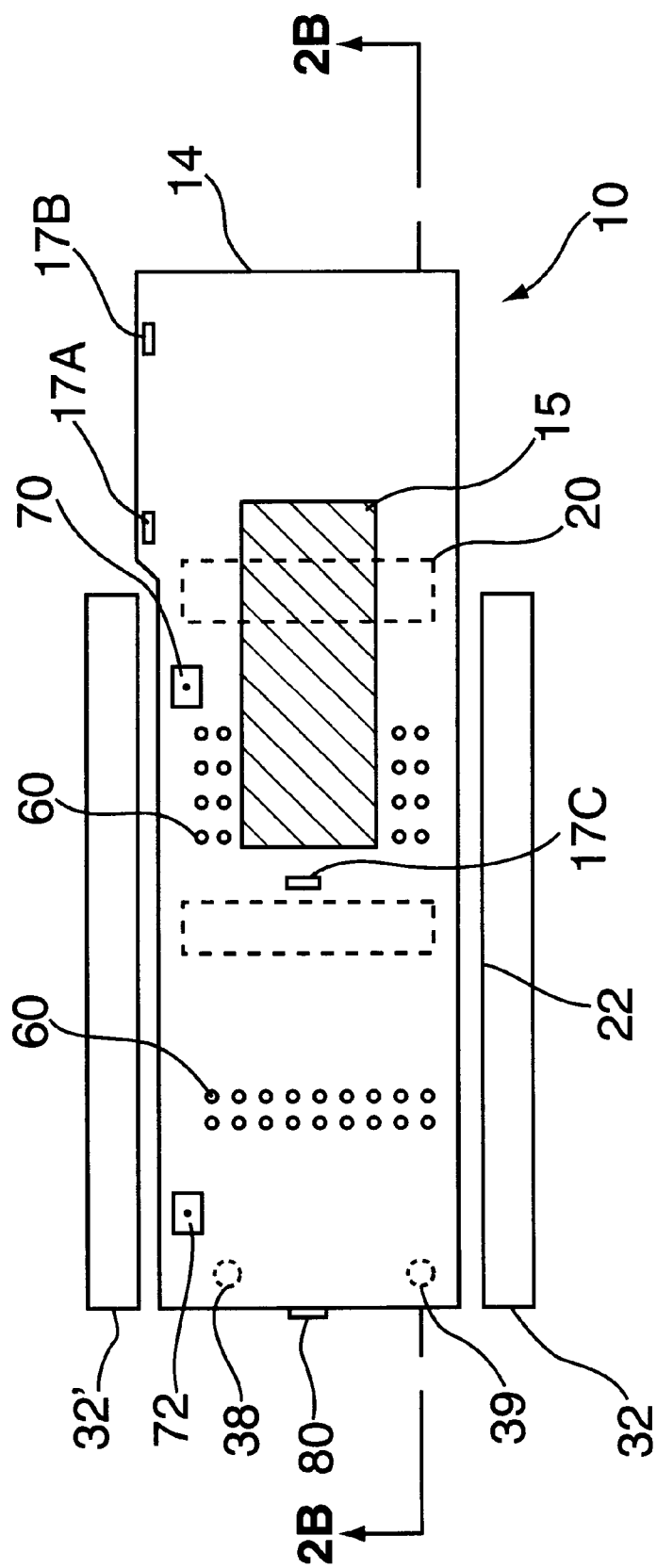
FIG. 2A shows a top view of the plate bed of the plate scanner-bending device of the present invention.
Figure 2B:
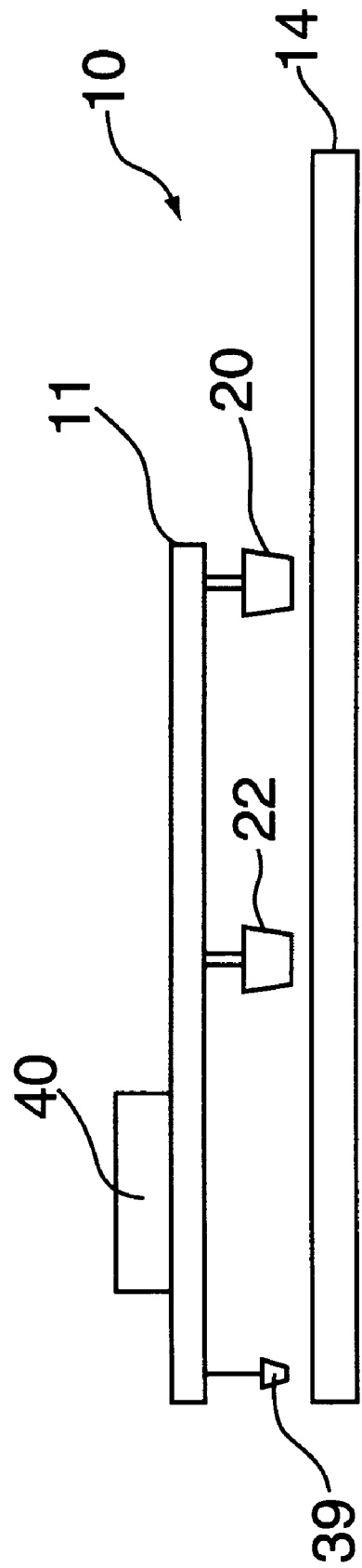
FIG. 2B shows a side view of the plate scanner bending device through the plane A—A shown in FIG. 2A.
Figure 4:
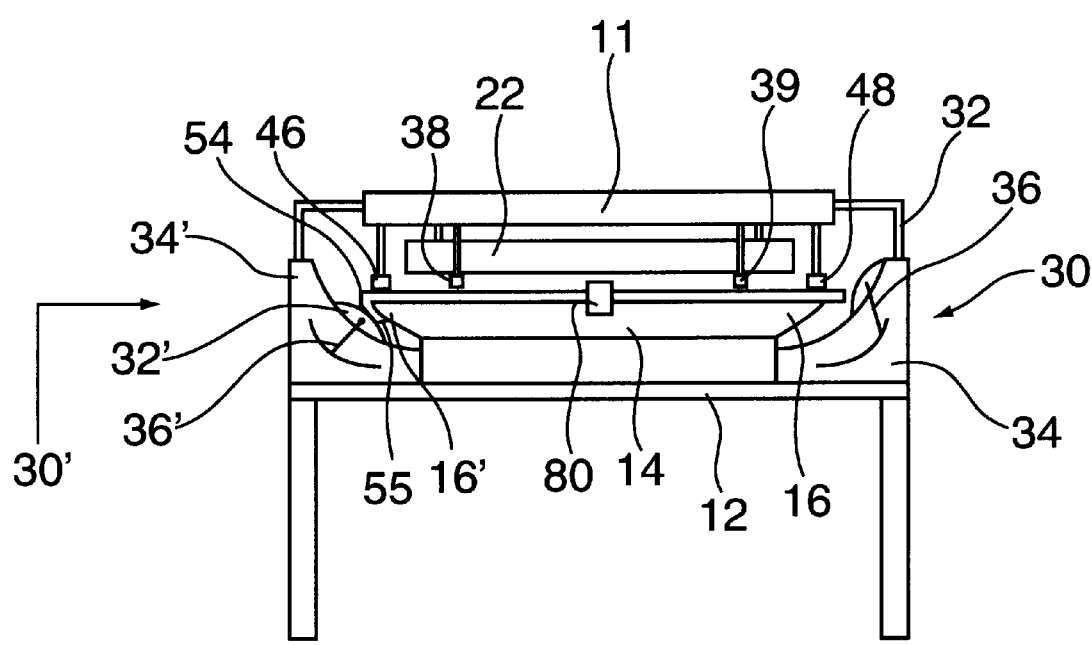
FIG. 4 shows an end view of the plate scanner-bending device after it has been bent.

FIGS. 2A and 2B show simplified top and side views of a plate scanner-bending device 10 comprising a plate bed 14 supported on a frame (shown in FIG. 4). A plate driver 15 may also be located within the plate bed 14 to transport the plate through the device 10. The driver may be a belt, as shown, driven rollers, or gripper fingers, or can be generally any device which moves the plate with respect to the plate bed 14. Rollers may also be placed on top of the plate to facilitate movement. Three initial stops 17A, 17B, and 17C may be provided to allow for initial positioning of the plate.

At least initial stop 17C is connected to a retraction device and is retractable into the plate bed. A vacuum source also may be located under the plate bed 14 to ensure that the plate is firmly held on the plate bed 14 through holes 60. The holes may be spaced as throughout the plate bed. An overhead support 11 supports two scan sensors 20 and 22 which are used to scan a printing plate for density. The scan sensors can be arranged in sets of 2,3, or four, depending on the total numbers of pages that need to be scanned at the same time for speed efficiency.

Along the sides at the plate bed 14, two bend bars 32 and 32' for bending the lead and trail ends of a printing plate are located, as will be described later with respect to FIG. 4.

Two retractable and movable pins 70 and 72 are also located in cutouts of the plate bed 14 for engaging holes in printing plate. The pins are controlled electronically by an x-y servo motor and have a home position in the center of the cutouts. The pins 70, 72 move together in the plane of the plate bed within their respective cutouts, and can move together in the sideways or forward directions, or slightly rotate the plate. Control directions from the microprocessor 40 are fed to the pins 70, 72 to control the position of the plate on the plate bed 14, once the pins have engaged the printing plate.

The scanner-bending device also comprises two register sensors 38, 39 connected to overhead support 11 for sensing the position of the images on the printing plate, typically through register marks burned onto a printing plate. The register sensors 38, 39 are connected electronically to a microprocessor 40. The microprocessor 40 also receives inputs from register drive mechanisms 6 for the different plate cylinders of the printing press.

A final stop 80 for the printing plate may be attached at the end of the plate bed 14 and may be rotatable or retractable downward so as to permit easy removal of the plate.

Figure 3:
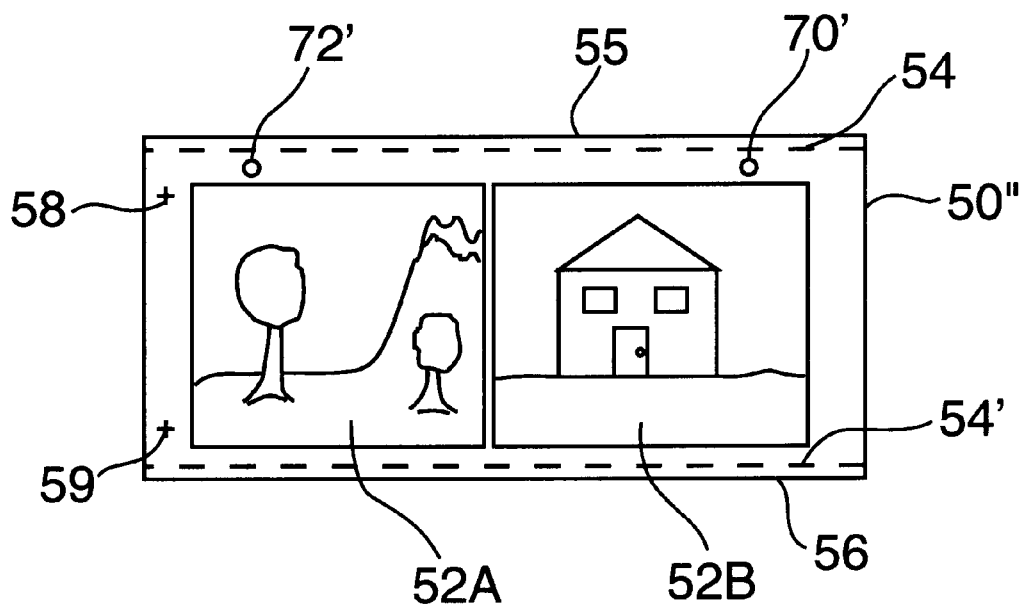
FIG. 3 shows a printing plate.

As shown in FIG. 3, a printing plate 50 has a trail edge 55 and a lead edge 56. Two image areas 52A and 52B and register marks 58, 59 are burned on the plate. The register marks 58, 59 are used to identify the position of the image areas 52A and 52B on the plate and are spaced away from the image. Depending on the circumferential register of the various plate cylinders within the printing press, the microprocessor 40 determines desired bend locations 54 and 54' for the trail edge and lead edge of the printing plate 50. Two holes 70' and 72' are punched in the plate 50 to interact with retractable pins 70 and 72 of the scanner-bending device.

FIG. 4 shows an end view of the scanner-bending device. The plate bed is supported on frame 12. At the end, the plate bed 14 is provided with angled edges, or anvils, 16 and 16' about which the bent edges of the printing plate can be formed. A bend mechanism 30 comprises a bend bar 32, a semi-circular housing 34 for the bend bar 30, and a bend bar actuator 36 for moving the bend bar 32 within the housing 34. Likewise, bend mechanism 30' comprises a bend bar 32', a semi-circular housing 34' for the bend bar 30', and a bend bar actuator 36', for moving the bend bar 32' within the housing 34'.

The overhead support 11 supports to the scan sensor 22 and the register sensors 38 and 39. The overhead support 11 also supports two clamping bars 46 and 48 which are retractable and may hold down the edges of the printing plate during bending. The overhead support may be supported directly on the bend bar housings, on the frame, or independently.

The operation of the plate scanner-bending device is follows. In a four color press, for example, there are four printing plates 50 for each image, one representing the cyan component, one the magenta, one the yellow and one the black. Each plate 50 is fed into the plate scanner-bending device. The operator, or marks on the plate itself, can identify which color component of the image that particular plate represents. The plate 50 is fed to an initial position on the plate bed 14, so that it is positioned against initial pins 17A, 17B and 17C. These pins are arranged so that when the plate later moves along the plate bed, holes 70' and 72' should align with the pins 70 and 72 in their home positions.

Pin 17C is then retracted and the plate driver 15 moves the plate along the plate bed 14. Scan sensor 20 begins scanning the first image 52A for density, and scan sensor 22 scans the second image 52B. This density information can then be fed to an automatic key control mechanism to properly set ink fountains feeding ink to the relevant plate cylinder for inking the plate during printing.

The plate 50 then is moved automatically until it rests against final stop 80. Pins 70', 72', which were retracted into the plate bed 14, then pop up and interact with the holes 70' and 72' in the printing plate 50. These pins 70, 72 are controlled by the microprocessor 40 and comprise a plate adjustment mechanism, which could also be a magnetic or other type of suitable device capable of accurate adjustment of the position of the plate 50 on the plate bed 14.

The microprocessor 40 identifies the circumferential register of each respective plate cylinder of the printing press from the register drive mechanisms 6 (FIG. 1). The register marks 58 and 59 are read by register sensors 38 and 39 so that the position of the images 52A and 52B on the plate 50 are known.

The desired bend locations 54, 54' for that particular printing plate are then determined by the microprocessor 40, so as to provide for proper circumferential register in the press. It also is possible that during processing the images 52A and 52B become slightly skewed with respect to the edges 55 and 56 of the plate 50, and this skewing can also be identified by sensors 38, 39 and the microprocessor 40 and corrected by selecting the proper bend locations 54, 54'. Alternatively, it is also possible that the plate cylinder 3 comprise a plate cocking mechanism, which can adjust slightly the slant of the plate cylinder 3 to correct for skewing of the image on the plate 50. In this case the sensors 38, 39 and microprocessor 40 identify the amount of skew and send control signals to the plate cocking mechanism for correction of the skew.

The plate 50 is then moved by the pins 70, 72 so that the desired bend locations 54' and 54 are located along the edges of the anvils 16 and 16'. The clamping bars 46 and 48 are lowered to hold the plate edges tight. The bend bar 32 is lowered to bend the lead edge 56 of the plate 50 is. Bend bar 32' is lowered to bend the trail edge 55 at bend location 54, as shown on the left side of FIG. 4. The clamping bars 46 and 48 can be raised again, as can the bend bars 32 and 32'. Stop 80 is then rotated, and the bent plate 50 removed, eventually to be placed on the proper plate cylinder of the printing press. Before removal, the register sensors 38, 39 can also determine the distance of the side of the image 52A from the side of the printing plate 50 and can feed that information through the microprocessor 40 to the register drive mechanism 6, which can then adjust the side lay register for the particular plate cylinder.

In this manner, all four plates 50 of a four color press may be quickly scanned and bent, with the circumferential and side lay register already adjusted. The press thus needs less adjustment at start up and paper waste may be reduced. The plate cylinders also can be reset to circumferential and axial zero positions after each plate change.

It should be noted that the distance between the initial stop 17C and the first end of the bed (opposite the end with stop 80) should be long enough to support the plate after it is placed on the plate bed 14. It thus can be a full plate length, or could be even smaller to save even more space.

Figure 5:
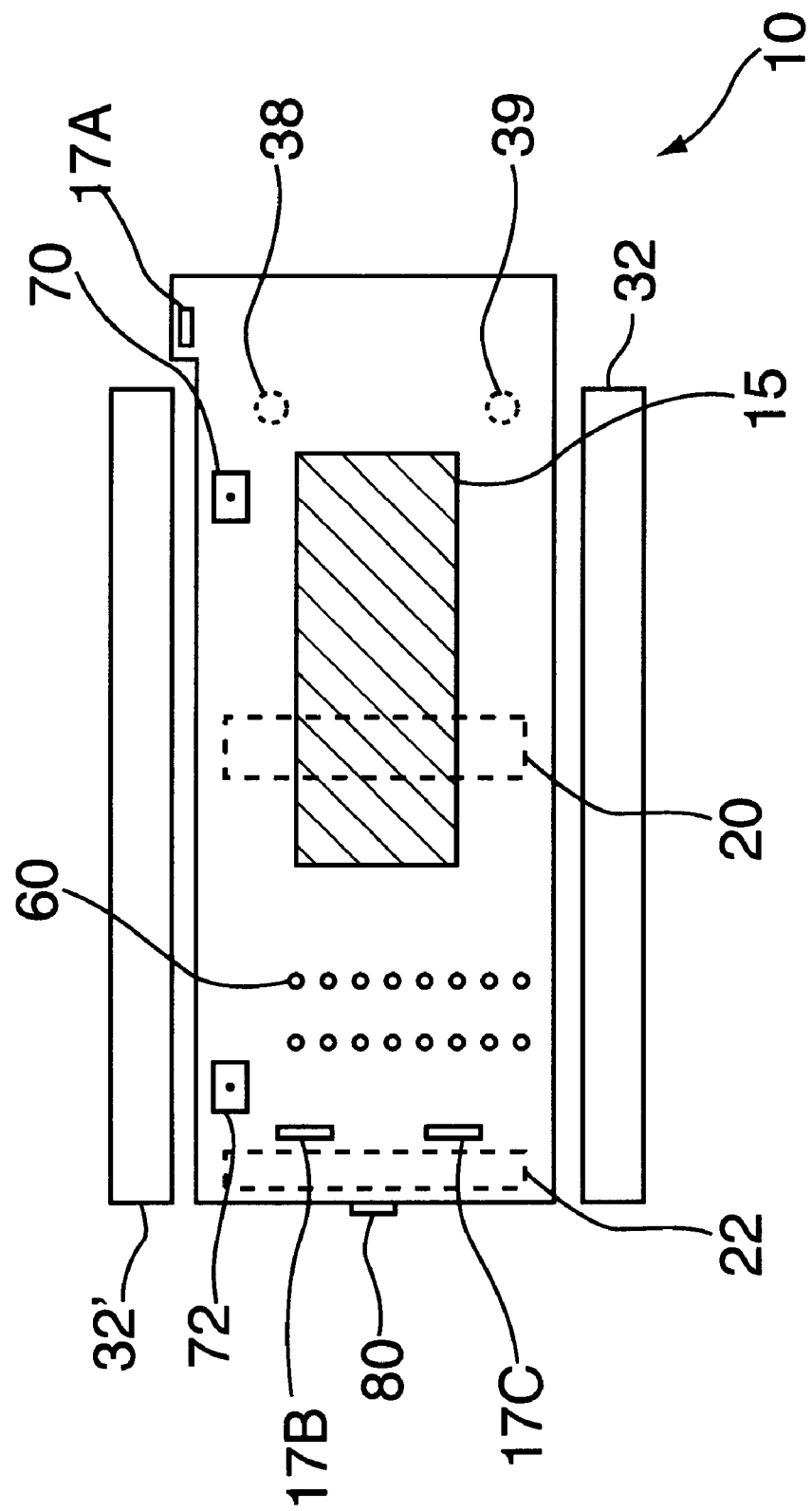
FIG. 5 shows another embodiment of the present invention.

In another embodiment of the present invention shown in FIG. 5, the bending takes place before the scanning. The plate is placed against the initial stops 17A, 17B and 17C. Pins 17B and 17C then retract and the plate is moved against stop 80 by the plate driver 15. The plate is bent as before and the bend bars 32 and 32' are retracted. The stop 80 is lowered and plate driver 15 then moves the plate out of the device 10. The scan sensors 20 and 22 scan the images as the plate exits. In this embodiment is preferable that the register marks 58 and 59 be located on the other end of the plate to interact with register sensors 38 and 39 as shown, and as described above. With this configuration, the device 10 can be almost as small as a plate itself. Preferably, the entire length of the device is only ⅛th longer than the plate itself. This size permits for proper initial placement by the three pins 17A, 17B and 17C, while minimizing the overall size of the device 10.

While the printing unit shown in FIG. 1 is for an offset printing press configuration, the present invention is useful as well with other types of printing that use plates. It also to be understood that the print unit may contain two plate cylinders and two blanket cylinders, rather than having an impression cylinder and that a plate may contain a plurality of images.

What is claimed is:

1. A plate scanner-bending device comprising:
   a plate bed for receiving a printing plate;
   a plate driver for moving the printing plate along the plate bed;
   at least one scan sensor located above the plate bed for scanning an image on the printing plate for density;
   at least one register sensor for sensing a position of the image on the printing plate;
   the plate bed having at least one anvil at one side; and
   at least one bending mechanism located next to the at least one anvil for bending the plate.

2. The plate scanner-bending device as recited in claim 1 further comprising a microprocessor for determining a desired bend location on the printing plate.

3. The plate scanner-bending device as recited in claim 2 wherein the microprocessor receives inputs from a register drive mechanism of a plate cylinder.

4. The plate scanner-bending device as recited in claim 1 wherein two register sensors are located next to the plate bed for sensing register marks on the printing plate.

5. The plate scanner-bending device as recited in claim 1 wherein the bending mechanism comprises a bending bar.

6. The plate scanner-bending device as recited in claim 1 wherein the bending mechanism comprises a bending bar and a housing for the bending bar.

7. A plate scanner-bending device comprising:
   a plate bed for receiving a printing plate;
   a plate driver for moving the printing plate along the plate bed;
   two scan sensors located above the plate bed for scanning an image on the printing plate for density;
   at least one register sensor for sensing a position of the image on the printing plate;
   the plate bed having at least one anvil at one side; and
   a bending mechanism located next to the at least one anvil for bending the plate.

8. The plate scanner-bending device as recited in claim 7 further comprising a microprocessor for determining a desired bend location on the printing plate.

9. The plate scanner-bending device as recited in claim 8 wherein the microprocessor receives inputs from a register drive mechanism of a plate cylinder.

10. The plate scanner-bending device as recited in claim 7 wherein two register sensors are located next to the plate bed for sensing register marks on the printing plate.

11. The plate scanner-bending device as recited in claim 7 wherein the bending mechanism comprises a bending bar.

12. The plate scanner-bending device as recited in claim 7 wherein the bending mechanism comprises a bending bar and a housing for the bending bar.

13. A plate scanner-bending device comprising:
    a plate bed for receiving a printing plate;
    two scan sensors located above the plate bed for scanning an image on the printing plate for density;
    at least one register sensor for sensing a position of the image on the printing plate;
    the plate bed having a pair of anvils at one end; and
    a bending mechanism located next to each anvil for bending a trail edge and a lead edge of the plate.

14. The plate scanner-bending device as recited in claim 13 further comprising a microprocessor for determining a desired bend location for the trail edge and the lead edge.

15. The plate scanner-bending device as recited in claim 13 wherein the microprocessor receives inputs from a register drive mechanism of a plate cylinder.

16. The plate scanner-bending device as recited in claim 13 wherein two register sensors are located next to the plate bed for sensing register marks on the printing plate.

17. The plate scanner-bending device as recited in claim 13 wherein each bending mechanism comprises a bending bar.

18. The plate scanner-bending device as recited in claim 13 wherein each bending mechanism comprises a bending bar and a housing for the bending bar.

19. The plate scanner-bending device as recited in claim 13 wherein at least one of the two sensors is located between the pair of anvils.

20. The plate scanner-bending device as recited in claim 14 wherein the at least one register sensor and the microprocessor are capable of determining a skew of the image on the printing plate.

* * * * *